United States Patent
Bredl et al.

(10) Patent No.: US 8,688,478 B2
(45) Date of Patent: Apr. 1, 2014

(54) COMPUTER-BASED SYSTEM AND METHOD FOR CALCULATING AN ESTIMATED RISK PREMIUM

(75) Inventors: Harald Bredl, Munich (DE); Ulrich Riegel, Munich (DE)

(73) Assignee: Swiss Reinsurance Company Ltd., Zurich (CH)

( * ) Notice: Subject to any disclaimer, the term of this patent is extended or adjusted under 35 U.S.C. 154(b) by 1319 days.

(21) Appl. No.: 11/910,848

(22) PCT Filed: Apr. 5, 2005

(86) PCT No.: PCT/CH2005/000194
§ 371 (c)(1),
(2), (4) Date: Oct. 5, 2007

(87) PCT Pub. No.: WO2006/105672
PCT Pub. Date: Oct. 12, 2006

(65) Prior Publication Data
US 2008/0167905 A1 Jul. 10, 2008

(51) Int. Cl.
*G06Q 40/08* (2012.01)
*G06Q 50/22* (2012.01)
(52) U.S. Cl.
CPC ............... *G06Q 40/08* (2013.01); *G06Q 50/22* (2013.01)
USPC ............................................................ 705/4
(58) Field of Classification Search
CPC ............................... G06Q 40/08; G06Q 50/22
USPC ............................................................ 705/4
See application file for complete search history.

(56) References Cited

U.S. PATENT DOCUMENTS

2004/0186753 A1* 9/2004 Kim et al. ..................... 705/4

OTHER PUBLICATIONS

J. Dhaene (Katholieke Universiteit Leuven) and M. J. Goovaerts, (Katholiefe Universiteit Leuven and Universiteit Amsterdam); "On the Dependency of Risks in the Individual Life Model," pp. 1-16.
G. Feilmeier and G. Segerer, "Einige Anmerkungen zur Rückversicherung von Kumulrisiken nach dem Verfahren Strickler", Blätter der Deutschen Gesellschaft für Versicherungsmathematik 14, 1980.

* cited by examiner

*Primary Examiner* — Daniel Felten
(74) *Attorney, Agent, or Firm* — Oblon, Spivak, McClelland, Maier & Neustadt, L.L.P.

(57) ABSTRACT

A computer-based system configured to calculate an estimated risk premium for reinsurance of a cedent's insurance policies covering loss event related fatalities and disabilities. The system stores, for different market scenarios, representative of loss events for a defined insurance market, frequency of loss event and number of insured individuals involved in the loss event. Based on these market scenarios and considering the cedent's market share, the system calculates individual scenarios, indicative of the cedent's exposure to the loss events. Using a standard distribution for the number of insured individuals involved in the loss event, for example a Pareto distribution, and using individual scenarios as interpolation points, the system calculates a set of loss event frequencies by number of individuals insured by the cedent and involved in a loss event. Finally, the system calculates the estimated risk premium from the set of loss event frequencies and from severity data.

17 Claims, 6 Drawing Sheets

COMPUTER-BASED SYSTEM AND METHOD FOR CALCULATING AN ESTIMATED RISK PREMIUM

FIELD OF THE INVENTION

The present invention relates to a computer-based system and method for calculating an estimated risk premium. Specifically, the present invention relates to a computer-based system and method for calculating an estimated risk premium for reinsurance of a cedent's insurance policies covering loss event related fatalities and disabilities.

BACKGROUND OF THE INVENTION

Reinsurers insure risks of primary insurers or other reinsurers (i.e. risks of cedents). Reinsurance includes proportional and non-proportional reinsurance. In the case of proportional insurance, the reinsurer participates for a defined share or proportion in the liabilities, premiums, and claims of a cedent's reinsured portfolio. In the case of non-proportional reinsurance, the reinsurer's liability is only triggered when the reinsured policy or portfolio of the cedent is affected by a loss, which exceeds a specific amount, the so-called deductible. Typically, the amount of loss exceeding the deductible is assumed by the reinsurer up to a defined treaty limit (upper limit of cover). There is exceeding loss (XL) reinsurance for individual losses, affecting a single (re)insured risk (e.g. a person or item of property) which is triggered by one and the same event (per risk), and for losses with accumulation, i.e. multiple policies or risks which are exposed to the same area of loss or risk and can be affected by the same ordinary loss occurrence (per event). For calculating his premium, the reinsurer has to determine quantitatively the risk of having to cover a loss of a cedent. An expected loss is calculated based on the number of persons involved in a loss event (e.g. an accident), the deductible of the cedent, the treaty limit, the number of persons or groups of persons insured by the cedent, and statistical data regarding the persons or groups of persons insured by the cedent. Thus, the expected loss is calculated based on the probabilities that a certain number of persons is involved in a loss event, that a certain loss amount is reached by a loss event involving a certain number of persons, and that a certain number of persons insured by the cedent are involved in a loss event. Specifically, the expected loss is calculated by the multiplication of these probability distributions. The most common approach used for calculating the expected loss is the so-called Strickler method, described for example, by G. Feilmeier and G. Segerer, "Einige Anmerkungen zur Rückversicherung von Kumulrisiken nach dem Verfahren Strickler", Blätter der Deutschen Gesellschaft für Versicherungsmathematik 14, 1980. From statistical data, the Strickler method determines a probability distribution indicating the probability that at least a certain number N of persons are affected in a loss event. The resulting probability distribution is converted into a probability distribution indicating the probability that an exact number of N persons are affected by a loss event. Furthermore, based on a probability distribution for the accumulated loss amount per affected person, a probability distribution for the loss amount of N affected persons is calculated from the loss amount per affected person through N−1-fold convolution. A probability distribution is calculated for the loss caused by an event with at least N affected persons through multiplication of the distribution of the probability that exactly n persons are affected by a loss event and the distribution of the loss amount for n persons affected, for the range of n≥N. To consider the circumstances of the cedent, the result is multiplied by the percentage of the insured that are insured by the cedent. Therefrom, based on the treaty limit and the deductible of the cedent, an expected value is calculated for the loss to be covered by the reinsurer and used as a basis for calculating the risk premium. For the distribution of the loss amount, the Strickler method assumes an exponential distribution.

Although the Strickler method does provide a way for estimating the risk of the reinsurer, the expected values calculated according to the Strickler method are quite unreliable. Typically, the statistical standard deviation is a multiple of the expected value. To improve the reliability of the Strickler method, specific distributions of the loss amount of the persons affected by a loss event are included in the calculation. Another weakness of the Strickler method is based on the fact that all cedents are assumed to be affected equally by a loss event. This weakness is improved by dividing the population concerned (e.g. population of a state or a region) into different classes, wherein the insured persons of the population considered are distributed equally in a class. A total probability of at least N persons being affected by a loss event is calculated from the probability that in a class a certain number of persons, insured by a certain cedent, are affected by a loss event. A computer-based system, configured to execute automatically the Strickler method, requires hardware and software resources for storing, maintaining, and accessing statistical data. Due to the fact that the frequency of large loss events may vary strongly over time, long time periods are used to collect the statistical data. Consequently, further hardware and software resources must be provided for capturing and storing the statistical data over long time periods, for example over fourteen or more years. The heavy dependency on long-term statistical data makes computer-based systems for executing the Strickler method inflexible. Moreover, this dependency increases the risk that the basis for the calculation, particularly the distribution of the loss frequency and/or loss amount, changes compared to the statistical data used and stored in the system. Consequently, additional hardware and software resources must be provided for updating constantly and continuously the statistical data. For that purpose the system must be interconnected via telecommunications networks with various data sources in different geographical regions. Furthermore, the system must be provided with software resources for merging and consolidating the statistical data provided by the different sources in possibly different formats.

SUMMARY OF THE INVENTION

It is an object of this invention to provide a computer-based system and a computer implemented method for calculating an estimated risk premium for reinsurance of a cedent's insurance policies covering loss event related fatalities and disabilities, which system and method do not have the disadvantages of the prior art. In particular, it is an object of this invention to provide a computer-based system and a computer implemented method for calculating the estimated risk premium, which system and method require less resources than systems and methods of the prior art for storing, maintaining, and accessing statistical data. It is a further object of the present invention to provide a computer-based system and a computer implemented method for calculating the estimated risk premium, which system and method require less resources than systems and methods of the prior art for capturing and storing the statistical data over long time periods, for updating constantly and continuously the statistical data, and for merging and consolidating the statistical data from different sources in possibly different formats. It is yet a further object of the present invention to provide a computer-based system and a computer implemented method for calculating the estimated risk premium, which system and method are implemented by means of a relatively small, low cost, off-the shelf computer, such as a personal computer, or a laptop or notebook computer.

According to the present invention, these objects are achieved particularly through the features of the independent claims. In addition, further advantageous embodiments follow from the dependent claims and the description.

According to the present invention, the above-mentioned objects are particularly achieved in that, to calculate an estimated risk premium for reinsurance of a cedent's insurance policies covering loss event related (e.g. accident related) fatalities and disabilities, a computer stores for a first type of market scenario, representative of a small, first type of loss event for a defined insurance market, a frequency of the first type of loss event and a number of insured individuals involved in the first type of loss event; the computer stores for a second type of market scenario, representative of a big, second type of loss event for the market, a frequency of the second type of loss event and a number of insured individuals involved in the second type of loss event; the computer calculates a first individual scenario, indicative of the cedent's exposure to the first type of loss event, based on the first type of market scenario; the computer calculates a second individual scenario, indicative of the cedent's exposure to the second type of loss event, based on the second type of market scenario; the computer calculates a first set of loss event frequencies by number of individuals insured by the cedent and involved in a loss event, using a standard distribution for the number of insured individuals involved in the loss event and using the first and second individual scenarios as interpolation points; and the computer calculates the estimated risk premium from the first set of loss event frequencies and from severity data. Data well known in a specific market can be used to define the first type of market scenario, for example, a car accident in the area of a specific state involving two persons and having a well-known loss event frequency. For defining the second type of market scenario, the number of persons affected by and the experienced or estimated loss event frequency of a rare but large loss event, such as an earthquake in a big city located in the state, can be used. Deriving from the market scenarios individual scenarios, indicative of the cedent's exposure to the market scenarios, and using the individual scenarios as interpolation points for calculating a set of loss event frequencies make it possible to calculate an estimated risk premium without the need for resources for capturing and storing over long time periods large amounts of statistical data, as in the systems of the prior art, without the need for updating and maintaining constantly and continuously the statistical data, and without the need for merging and consolidating the statistical data from different sources in possibly different formats. In other words, unlike the systems of the prior art, which are configured to receive and store probability distributions, the system according to the present invention is configured to use only the market or individual scenarios, respectively, as base data for calculating the loss event frequencies by number of insured and affected persons. Consequently, the proposed system not only requires less resources than the prior art for capturing and storing statistical data, but the proposed system is also much more flexible than the prior art in that the system is adapted easier and quicklier to changing circumstances in a market. The proposed system makes possible a calibration of the system based on a reduced number of input parameters.

In a preferred embodiment, the first individual scenario is calculated by weighting the frequency of the first type of loss event with a market share of the cedent and by keeping unchanged the number of insured individuals involved in the first type of loss event. The second individual scenario is calculated by weighting the number of insured individuals involved in the second type of loss event with the market share of the cedent and by keeping unchanged the frequency of the second type of loss event. The cedent's exposure to the first type of market scenario, representative of small loss events, is determined by calculating the cedents (market) share of the frequency of the small loss events. The cedent's exposure to the second type of market scenario, representative of big loss events, is determined by calculating the cedents (market) share of the number of insured individuals involved in a big loss event. Thus, without defining and entering any cedent specific probability distribution, the cedent's exposure to the market scenarios can be determined easily and flexibly based on the cedent's market share, which is entered and stored in the system.

Preferably, for calculating the first set of loss event frequencies, a Pareto distribution is used for the number of insured individuals involved in a loss event, the number of individuals ranging from a defined lower bound (e.g. two) to a defined upper bound (e.g. one thousand). Using a Pareto distribution as an assumed standard distribution for the number of insured individuals involved in a loss event, makes it possible to calculate easily a set of loss event frequencies by number of individuals insured by the cedent and involved in the loss event, using the first individual scenario and the second individual scenario as interpolation points.

In an embodiment, the second type of market scenario is representative of a big loss event involving group policies and individual policies with equal probability. The method further includes the computer storing for a third type of market scenario, representative of a medium, third type of loss event for the market involving mostly one group policy, a frequency of the third type of loss event and a number of insured individuals involved in the third type of loss event. Moreover the computer stores for a fourth type of market scenario, representative of a big, fourth type of loss event for the market involving mostly one group policy, a frequency of the fourth type of loss event and a number of insured individuals involved in the fourth type of loss event. The computer calculates a third individual scenario, indicative of the cedent's exposure to the third type of loss event, based on the third type of market scenario. The computer calculates a fourth individual scenario, indicative of the cedent's exposure to the fourth type of loss event, based on the fourth type of market scenario. Furthermore, the computer calculates, a second set of loss event frequencies by number of individuals insured by the cedent and involved in a loss event, using a standard distribution for the number of insured individuals involved in the loss event, preferably a Pareto distribution, and using the third and fourth individual scenarios as interpolation points. Finally, the computer calculates the risk premium from the first set of loss event frequencies, the second set of loss event frequencies, and the severity data. Data well known in a specific market can be used to define the third type of market scenario, for example, a bus accident at a company trip involving mainly the group policy for the company and having a defined number of insured persons and a defined frequency in the market. For defining the fourth type of market scenario, the number of persons affected by and the experienced or estimated loss event frequency of a rare but large event, such as an explosion on an oil platform involving mainly one group policy, can be used. Deriving from the market scenarios individual scenarios, indicative of the cedent's exposure to the market scenarios affecting group policies, and using the individual scenarios as interpolation points for calculating a second set of loss event frequencies make it possible to calculate an estimated risk premium, specifically for loss events affecting group policies, with the same advantages of reduced need for resources and increased flexibility in adapting to changing market circumstances as described above. Consequently, this embodiment requires less resources than the prior art for capturing and storing statistical data. Moreover, the embodiment shows a more flexible adaptation to changing market conditions, while the risk premium is calculated considering the impact of loss events on individual and group policies.

In a further embodiment, the third individual scenario is calculated by weighting the frequency of the third type of loss event with a group market share of the cedent and by keeping unchanged the number of insured individuals involved in the third type of loss event. The fourth individual scenario is calculated by weighting the frequency of the fourth type of loss event with a group market share of the cedent and by keeping unchanged the number of insured individuals involved in the fourth type of loss event. The cedent's exposure to the third and fourth types of market scenario, representative of medium and big loss events involving mainly group policies, are determined by calculating the cedent's (market) share of the frequency of the medium or big loss events, respectively. Thus, without defining and entering any cedent specific probability distribution, the cedent's exposure to the market scenarios affecting group policies can be determined easily and flexibly based on the cedent's respective market shares, which are entered and stored in the system.

In a variant, the severity data is stored as a fixed loss amount per insured individual and the risk premium is calculated based on the severity data stored. This variant provides a way for calculating the risk premium from severity data stored as a fixed loss amount per insured individual. Consequently, there is no need for capturing and storing market information and portfolio data, with information about the cedent's insurance policies, for calculating severity data as a loss amount distribution.

In a further preferred embodiment, the computer stores portfolio data with information about the cedent's insurance policies, including number of policies with insurance sum for disability, values of the insurance sum for different degrees of disability, number of policies with pensions for disability, values of the pensions for different degrees of disability, number of policies with insurance sum for fatality, and values of the insurance sum for fatality. The computer calculates the severity data as a severity distribution of loss amount per insured individual from stored information about the cedent's insurance policies, from an age distribution of insured individuals, and from market information, including a relative frequency of fatality or disability and relative frequencies of the degrees of disability. Age of insured individuals, the values of the insurance sums, and the values of the pensions are considered to be independent random variables. The estimated risk premium is calculated based on the severity data calculated.

In addition to a computer-based system and a computer implemented method for calculating an estimated risk premium for reinsurance of a cedent's insurance policies covering loss event related fatalities and disabilities, the present invention also relates to a computer program product including computer program code means for controlling one or more processors of a computer such that the computer executes the method described above. Particularly, the computer program product includes a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
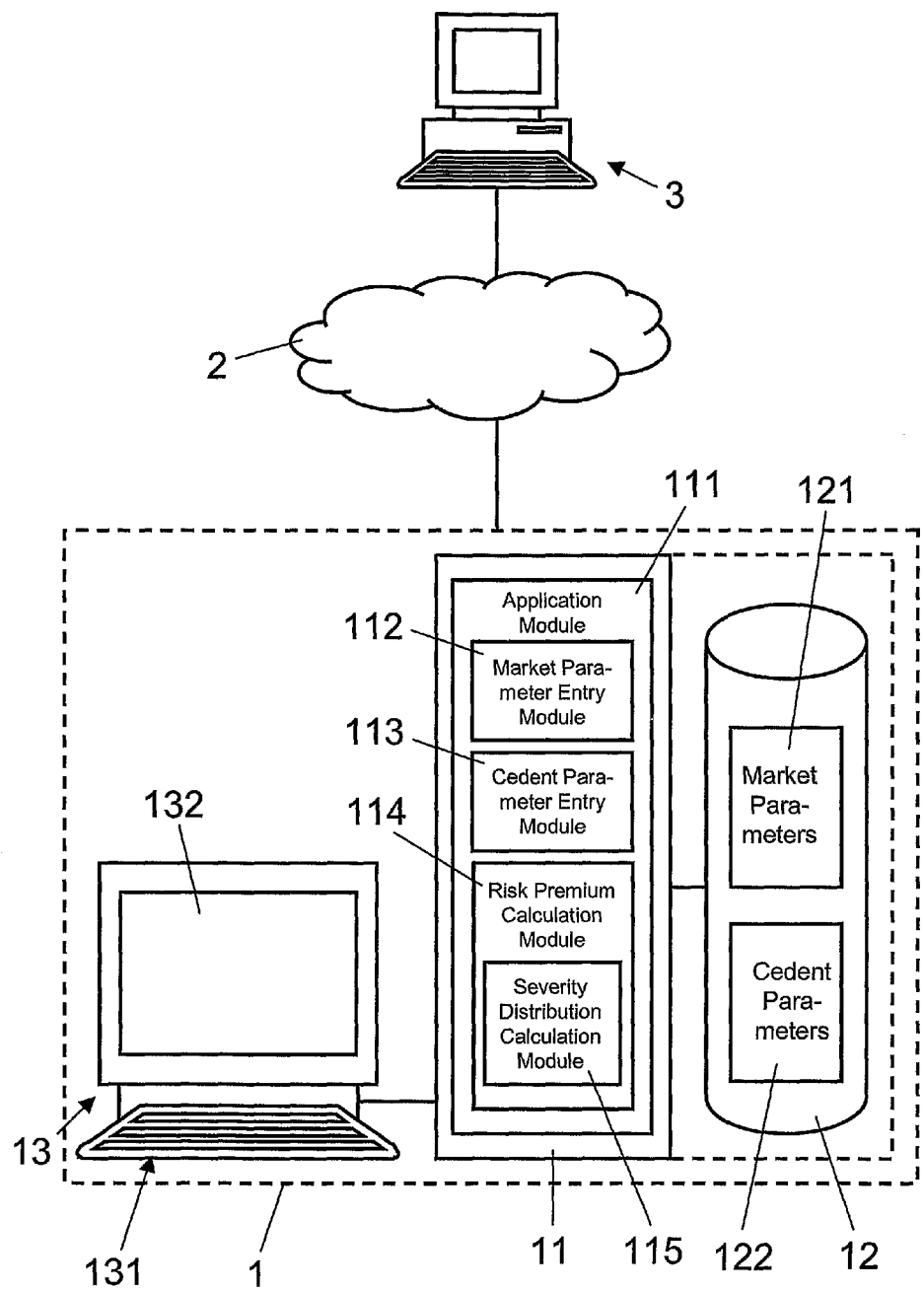
FIG. 1 shows a block diagram illustrating schematically an exemplary configuration of a computer-based data processing system for practicing embodiments of the present invention, said configuration comprising a computer with programmed software modules, a database, a display, and data entry means.

In FIG. 1, reference numeral 1 refers to a computer-based data processing system. The data processing system 1 includes one or more computers 11, for example personal computers, comprising one or more processors. As is illustrated schematically, the data processing system 1 includes several functional modules, namely an application module 111, a market parameter entry module 112, a cedent parameter entry module 113, a risk premium calculation module 114, and a severity distribution calculation module 115. The functional modules are implemented as programmed software modules controlling the processor(s) of computer 11. For example, the functional modules are implemented as independent application modules, as spreadsheet applications, e.g. in Microsoft Excel, or as web applications, e.g. based on HTML (Hypertext Markup Language) or XML (Extended Markup Language). The computer program code of the software modules is stored in a computer program product, i.e. in a computer readable medium, either in memory integrated in computer 11 or on a data carrier that can be inserted into computer 11. The database 12 is configured for storing a data set with market parameters 121 and a data set with cedent parameters 122. The database 12 is implemented on the same computer as the functional modules or on a separate computer. For example, the database 12 is implemented by means of a (relational) database management system, as a set of program tables, and/or as one or more structured data files, e.g. a spreadsheet. Computer 11 is connected to local data entry terminal 13 including data entry means 131, such as a keyboard and a mouse, and a display 132. The data processing system 1 is also connected via a telecommunications network 2 to a remote data entry terminal 3, for example a personal computer. For example, telecommunications network 2 includes the Internet such that a remote user, e.g. the cedent, is able to enter cedent related data through the remote data entry terminal 3 and have the system 1 calculate the risk premium for reinsurance of some of the cedent's insurance policies covering loss event related fatalities and disabilities.

When the application module 111 is started on computer 11, the user of data entry terminal 13, e.g. the reinsurer, (or the user of the remote data entry terminal 3, e.g. the cedent) is presented with a user interface for selecting functions to be performed. When selecting an option to maintain market parameters, the market parameter entry module 112 is started. Depending on the implementation, market parameters for different insurance markets, such as countries or states, can be selected. The user of data entry terminal 13 is presented with a user interface to enter, view, and modify market parameters for a selected market. When selecting an option to maintain cedent parameters, the cedent parameter entry module 113 is started. The user of data entry terminal 13 (or remote data entry terminal 3) is presented with a user interface to enter, view, and modify cedent parameters for a specified cedent. Values of the market or cedent parameters are shown on display 132, new values are entered via the data entry means 131. When selecting an option for calculating the risk premium for the reinsuring the insurance portfolio of a selected cedent, the risk premium calculation module 114 is started. User interfaces presented on data entry terminal 3 and/or 13 are typically graphical user interfaces (GUI), implemented, for example, by means of a GUI design programming language, HTML or XML, or a spreadsheet application.

Figure 2:
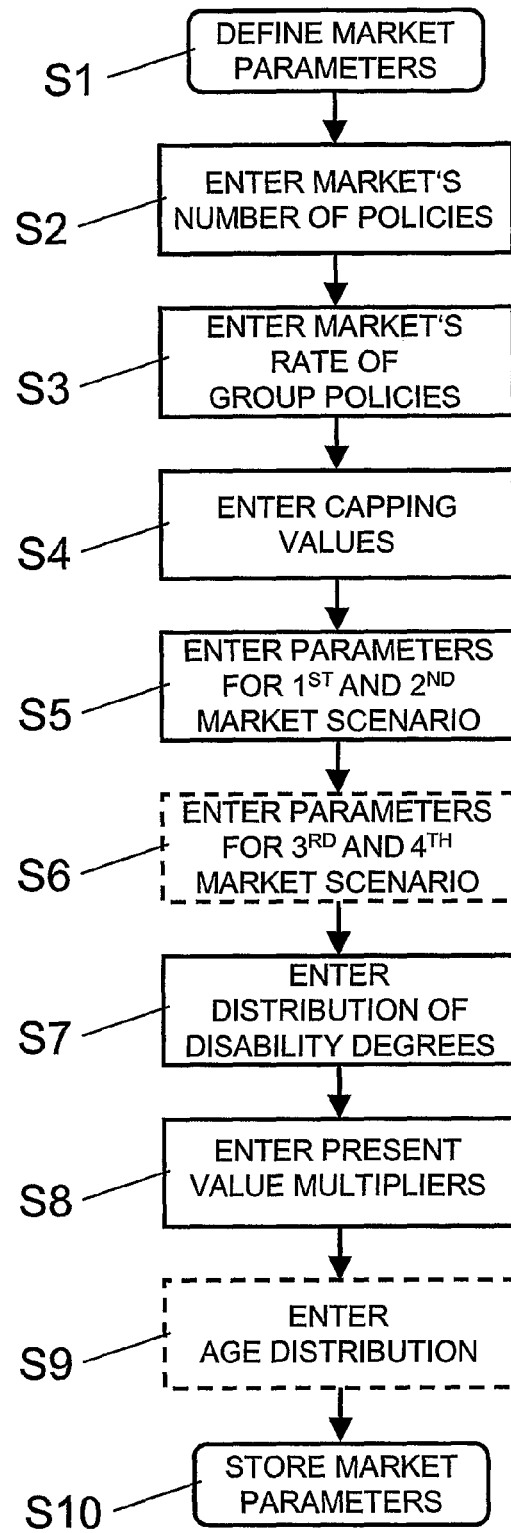
FIG. 2 shows a flow diagram illustrating an example of a sequence of preparatory steps for defining market parameters, executed according to the present invention.

FIG. 2 illustrates an example of a sequence of steps for defining the market parameters. In step S1, the market parameter entry module 112 is started.

In step S2, the total number of policies $A_M$ of the selected market is entered. The total number of policies includes all group and individual policies covering loss events related to fatalities and disabilities. A person who has coverage for fatality as well as disability is counted twice.

In step S3, the market's rate $g_M$ of group policies is entered. The market's rate of group policies indicates the proportion of the market's total number of insureds that relate to group policies. The market's rate of group policies is entered as a value in the range of [0 . . . 1] or as a percentage. It is also possible to enter the market's number of group policies and have the market parameter entry module 112 calculate the market's rate of group policies.

In step S4, for calculation purposes, a lower capping value $K_u$ and an upper capping value $K_o$ are defined for setting an upper and lower limit to a cedent's market share. Default values for the capping values are set by the system.

In step S5, parameters for a first and a second market scenario are entered. The first type of market scenario is representative of a small type of loss event for the market, for example a car accident involving two persons. The parameters for this first market scenario include the frequency $f_1$ of the small type of loss event and the number of insured individuals $N_1$ involved in the small type of loss event. The second type of market scenario is representative of a big type of loss event for the market, affecting individual and group policies with the same probability, for example an earthquake in a large city. The parameters for this second market scenario include the frequency $f_2$ of the big type of loss event and the number of insured individuals $N_2$ involved in the big type of loss event. The first and a second market scenario are also referred to as market scenarios for individuals.

In step S6, if group policies are to be considered, parameters for a third and a fourth market scenario are entered. The third type of market scenario is representative of a medium type of loss event for the market, affecting mostly one group policy, for example a bus accident at a company trip. The parameters for this third market scenario include the frequency $f_A$ of the medium group type of loss event and the number of insured individuals $N_A$ involved in the medium group type of loss event. The fourth type of market scenario is representative of a big type of loss event for the market affecting mostly one group policy, for example an explosion on an oil platform. The parameters for this fourth market scenario include the frequency $f_B$ of the big group type of loss event and the number of insured individuals $N_B$ involved in the big group type of loss event. The third and fourth market scenarios are also referred to as market scenarios for groups.

In step S7, the market's distribution of disability degrees $p_1, \ldots, p_{100}$ are entered. The distribution of disability degrees is entered as a table including a frequency for each possible disability degree in the range of [1 . . . 100]. The distribution of disability degrees is entered manually or as a reference to a respective data file.

In step S8, the market's present value multipliers (Barwertfaktoren) are entered. The present value multipliers (Barwertfaktoren) are entered manually or as a reference to a respective data file. In addition, the market's relative frequency of mortality $H_T$ is entered. For a loss event involving N individuals, the expected number of fatalities is $N_F = H_T \cdot N$. The relative frequency for disability is $H_I = 1 - H_T$.

In step S9, the market's age distribution is entered. The age distribution is entered as a table including a rate per age. The age distribution is entered manually or as a reference to a respective data file. As will be described later, in an embodiment, the age distribution is determined specifically for a cedent based on portfolio data of the respective cedent.

In step S10, the market parameters entered and defined in steps S2 to S9 are stored in the database 12 as a data set with market parameters 121 assigned to the selected market.

Figure 3:
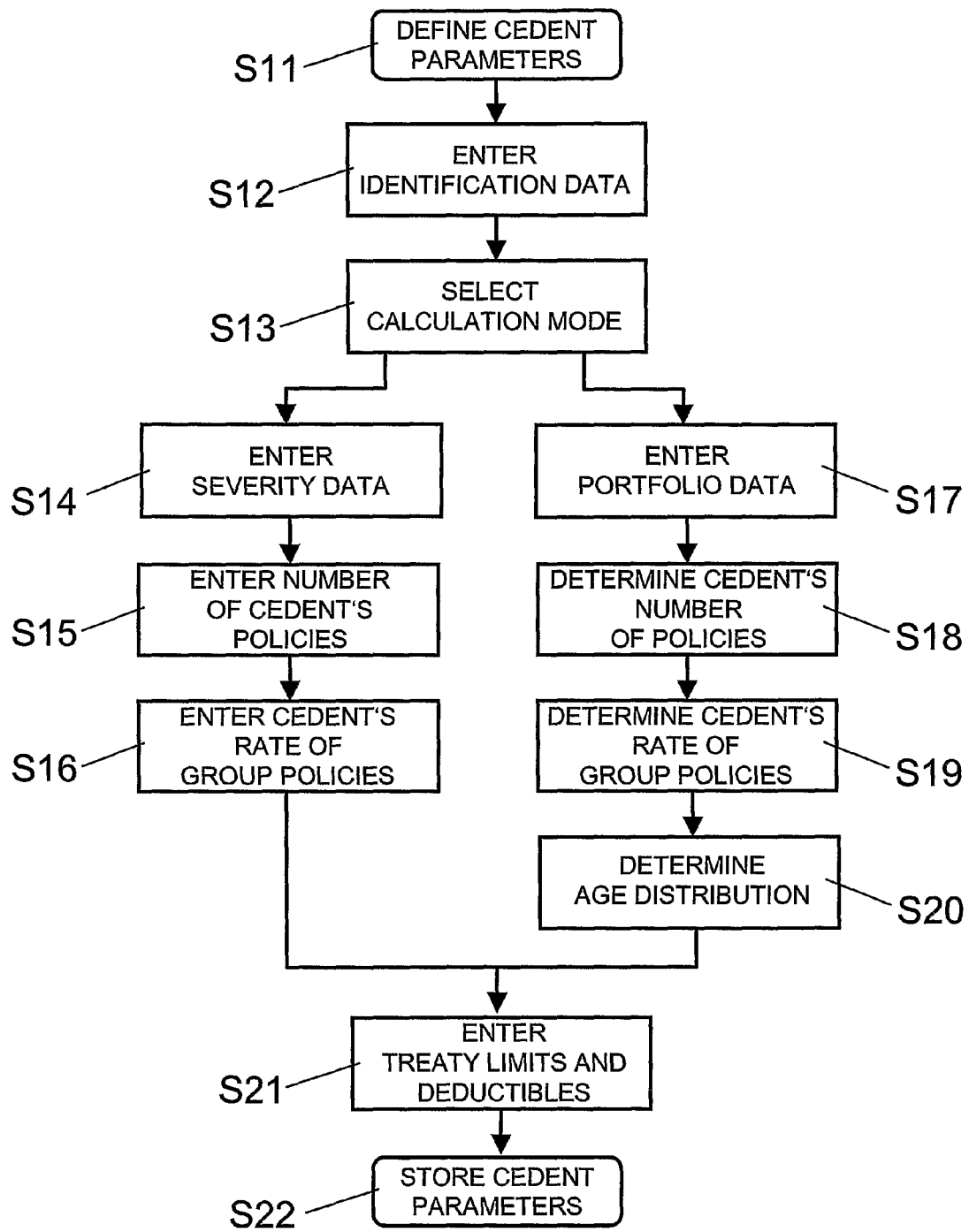
FIG. 3 shows a flow diagram illustrating an example of a sequence of preparatory steps for defining cedent parameters, executed according to the present invention.

FIG. 3 illustrates an example of a sequence of steps for defining the cedent parameters. In step S11, the cedent parameter entry module 113 is started.

In step S12, a cedent, already stored in the database 12 as a data set with cedent parameters 122, is selected or identification data of a new cedent is entered, for example the company name of the cedent. A cedent is associated with a specific insurance market. Furthermore the gross net premium income (GNPI) for the cedent is entered.

In step S13, the user selects a calculation mode: either, (a), calculation of the estimated risk premium based on a fixed loss amount per person, or, (b), calculation of the estimated risk premium based on a distribution of loss amount per person. For calculation mode (a), the sequence continues in step S14; for calculation mode (b), the sequence continues in step S17.

In step S14, severity data is entered as a fixed loss amount S per person.

In step S15, the total number of the cedent's policies A is entered, a person who has coverage for fatality as well as disability being counted twice.

In step S16, the cedent's rate of group policies g is entered. The cedent's rate of group policies indicates the proportion of the cedent's total number of policies that relate to group policies. The cedent's rate of group policies is entered as a value in the range of [0 . . . 1] or as a percentage. It is also possible to enter the cedent's number of group policies and have the cedent parameter entry module 113 calculate the cedent's rate of group policies.

In step S17, the cedent's portfolio data is entered. The cedent's portfolio data includes information about the cedent's insurance policies. Particularly, the portfolio data includes data about the split of policies related to fatalities, data about the split of policies related to disabilities with insurance sum, and data about the split of policies related to disabilities with pension. The data about the split of policies related to fatalities and the data about the split of policies related to disabilities with insurance sum include the different amounts of insured sums (lump sum payment) and the number of policies per insured sum. The data about the split of policies related to disabilities with pension includes the different amounts of pensions (e.g. monthly pension) and the number of policies per pension. Thus, the portfolio data includes number of policies with insurance sum for disability, values of the payment of indemnity for different degrees of disability, number of policies with pensions for disability, values of the pensions for different degrees of disability, number of policies with insurance sum for fatality, and values of the insurance sum for fatality. The portfolio data is entered manually into tables or as a reference to respective data files. The cedent's portfolio data includes data related to individual policies as well as data related to group policies. In an embodiment, the cedent's portfolio data also includes data about the age of the individuals covered under the cedents policies. For example, the cedent's portfolio data includes an age distribution of the individuals covered by the cedent's policies.

In step S18, the total number of the cedent's policies A is determined from the cedent's portfolio data.

In step S19, the cedent's rate of group policies g is determined from the cedent's portfolio data.

In step S20, the age distribution is entered as part of the portfolio data (see option in step S17) or the market is used to define the age distribution (see step S9).

In step S21, for reinsurance of the cedent's portfolio, the treaty limits $c_i$ and deductibles $d_i$ are entered. A different tuple $[c_i, d_i]$ of treaty limit and deductible is entered for the different risk layers to be reinsured.

In step S22, the cedent parameters entered and defined in steps S12 to S21 are stored in the database 12 as a data set with cedent parameters 122 assigned to the selected/defined cedent.

Figure 4:
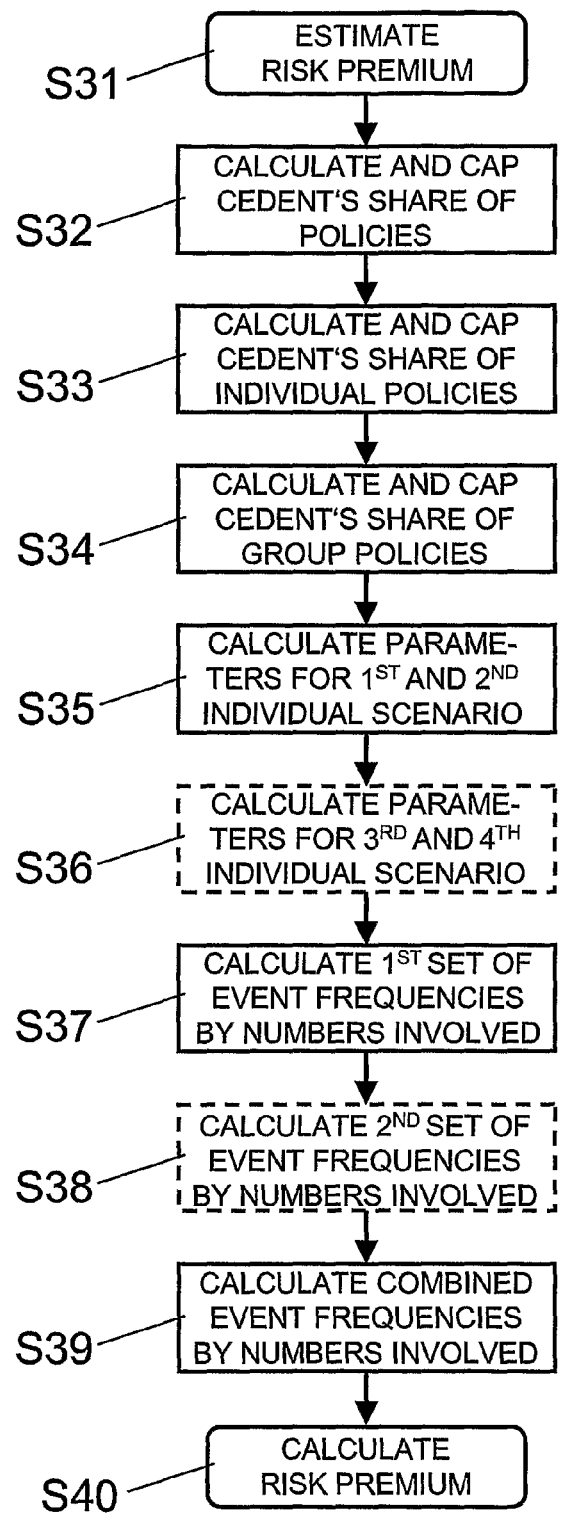
FIG. 4 shows a flow diagram illustrating an example of a sequence of steps for calculating an estimated risk premium, executed according to the present invention.

FIG. 4 illustrates an example of a sequence of steps for calculating the estimated risk premium. In step S31, the risk premium calculation module 114 is started.

In steps S32, S33, and S34, the cedent's market share m, the cedent's market share of individual policies $m_E$, and the cedent's market share of group policies $m_g$ are calculated from the cedent's total number of policies A, the market's total number of policies $A_M$, the cedent's rate of group policies g, and the market's rate of group policies $g_M$:

$$m = \frac{A}{A_M}, \ m_E = \frac{(1-g)A}{(1-g_M)A_M} \text{ and } m_G = \frac{g A}{g_M A_M}.$$

Furthermore, using the capping factors $K_u$, $K_o$, in steps S32, S33, and S34, the cedent's market share m, the cedent's market share of individual policies $m_E$, and the cedent's market share of group policies $m_g$ are capped:

$$\tilde{m} = \max(k_u; \min(k_o; m))$$

$$\tilde{m}_E = \max(k_u; \min(k_o; m_E))$$

$$\tilde{m}_G = \max(k_u; \min(k_o; m_G))$$

In step S35, based on the first type of market scenario, a first individual scenario, indicative of the cedent's exposure to the small type of loss event, is calculated for the cedent. For defining the first individual scenario, the frequency of the first individual scenario $f_{1'}$ is calculated by weighting the frequency of the small type of loss event with the cedent's market share; and the number of insured individuals $N_{1'}$ involved in the first individual scenario is defined by keeping unchanged the number of insured individuals involved in the small type of loss event. For calculation purposes, it is assured that the frequency of the first individual scenario is not below a defined minimum value $f_{1'}^{min}$.

$$N_{1'} := N_1, f_{1'} := \max(\tilde{m} f_1, f_{1'}^{min}).$$

Furthermore, in step S35, based on the second type of market scenario, a second individual scenario, indicative of the cedent's exposure to the big type of loss event, is calculated for the cedent. For defining the second individual scenario, the frequency of the second individual scenario $f_{2'}$ is set to the unchanged frequency of the big type of loss event; and the number of insured individuals $N_{2'}$ involved in the second individual scenario is calculated by weighting the number of insured individuals involved in the big type of loss event with the cedent's market share. For calculation purposes, it is assured that the number of insured individuals involved in the second individual scenario is not below a defined minimum value $N_{2'}^{min}$.

$$N_{2'} := \max(\tilde{m} N_2, N_{2'}^{min}), f_{2'} := f_2.$$

In step S36, if group policies are to be considered, based on the third type of market scenario, a third individual scenario, indicative of the cedent's exposure to the medium type of loss event, is calculated for the cedent. For defining the third individual scenario, the frequency of the third individual scenario $f_{A'}$ is calculated by weighting the frequency of the medium type of loss event with the cedent's market share; and the number of insured individuals $N_{A'}$ involved in the third individual scenario is defined by keeping unchanged the number of insured individuals involved in the medium type of loss event. For calculation purposes, it is assured that the frequency of the third individual scenario is not below a defined minimum value $f_{A'}^{min}$.

$$N_{A'} := N_A, f_{A'} := \max(\tilde{m}_G f_A, F_{A'}^{min}).$$

Furthermore, if group policies are to be considered, in step S36, based on the fourth type of market scenario, a fourth individual scenario, indicative of the cedent's exposure to the big type of loss event, affecting mostly one group policy, is calculated for the cedent. For defining the fourth individual scenario, the frequency of the fourth individual scenario $f_{B'}$ is calculated by weighting the frequency of the big type of loss event, affecting mostly one group policy, with the cedent's market share; and the number of insured individuals $N_{B'}$ involved in the forth individual scenario is defined by keeping unchanged the number of insured individuals involved in the big type of loss event, affecting mostly one group policy. For calculation purposes, it is assured that the frequency of the fourth individual scenario is not below a defined minimum value $f_{B'}^{min}$.

$$N_{B'} := N_B, f_{B'} := \max(\tilde{m}_G f_B, f_{B'}^{min}).$$

In step S37, calculated is a first set of loss event frequencies $f_{N12}$ by number of individuals insured by the cedent and involved in a loss event, assuming a standard distribution for the number of individuals involved in the loss event. The first set of loss event frequencies is calculated using the first individual scenario and the second individual scenario as interpolation points. Preferably, a Pareto distribution is used as the standard distribution for the number of insured individuals involved in the loss event. The first set of loss event frequencies defines for the cedent's individual policies the frequency that at least N individuals (persons) insured by the cedent are involved (affected) by a loss event. The first set of loss event frequencies $f_{N12}$ is defined by:

$$f_{1'} \cdot (N_{1'}/N)^{\alpha_{1'2'}},$$

wherein $$\alpha_{1'2'} := \frac{\ln(f_{2'}) - \ln(f_{1'})}{\ln(N_{1'}) - \ln(N_{2'})}.$$

Furthermore, if group policies are to be considered, in step S38, calculated is a second set of loss event frequencies $f_{NAB}$ by number of individuals insured by the cedent and involved in a loss event, assuming a standard distribution for the number of individuals involved in the loss event.

The second set of loss event frequencies is calculated using the third individual scenario and the fourth individual scenario as interpolation points. Preferably, a Pareto distribution is used as the standard distribution for the number of insured individuals involved in the loss event. The second set of loss event frequencies defines for the cedent's group policies the frequency that at least N individuals (persons) insured by the cedent are involved (affected) by a loss event. The second set of loss event frequencies $F_{NAB}$ is defined by:

$$f_{A'} \cdot (N_{A'}/N)^{\alpha_{A'B'}},$$

wherein $$\alpha_{A'B'} := \frac{\ln(f_{B'}) - \ln(f_{A'})}{\ln(N_{A'}) - \ln(N_{B'})}.$$

In step S39, a combined set of loss event frequencies $f_N$ by number of individuals insured by the cedent and involved in a loss event is calculated by adding the first and second sets of loss event frequencies $f_{N12}, F_{NAB}$. The combined set of loss event frequencies $f_N$ defines the frequency that a loss event involving (affecting) at least N individuals (persons) insured by the cedent occurs in the cedent's portfolio. The combined set of loss event frequencies $f_N$ is calculated as:

$$f_N := f_{1'} \cdot (N_{1'}/N)^{\alpha_{1'2'}} + f_{A'} \cdot (N_{A'}/N)^{\alpha_{A'B'}}.$$

Figure 6:
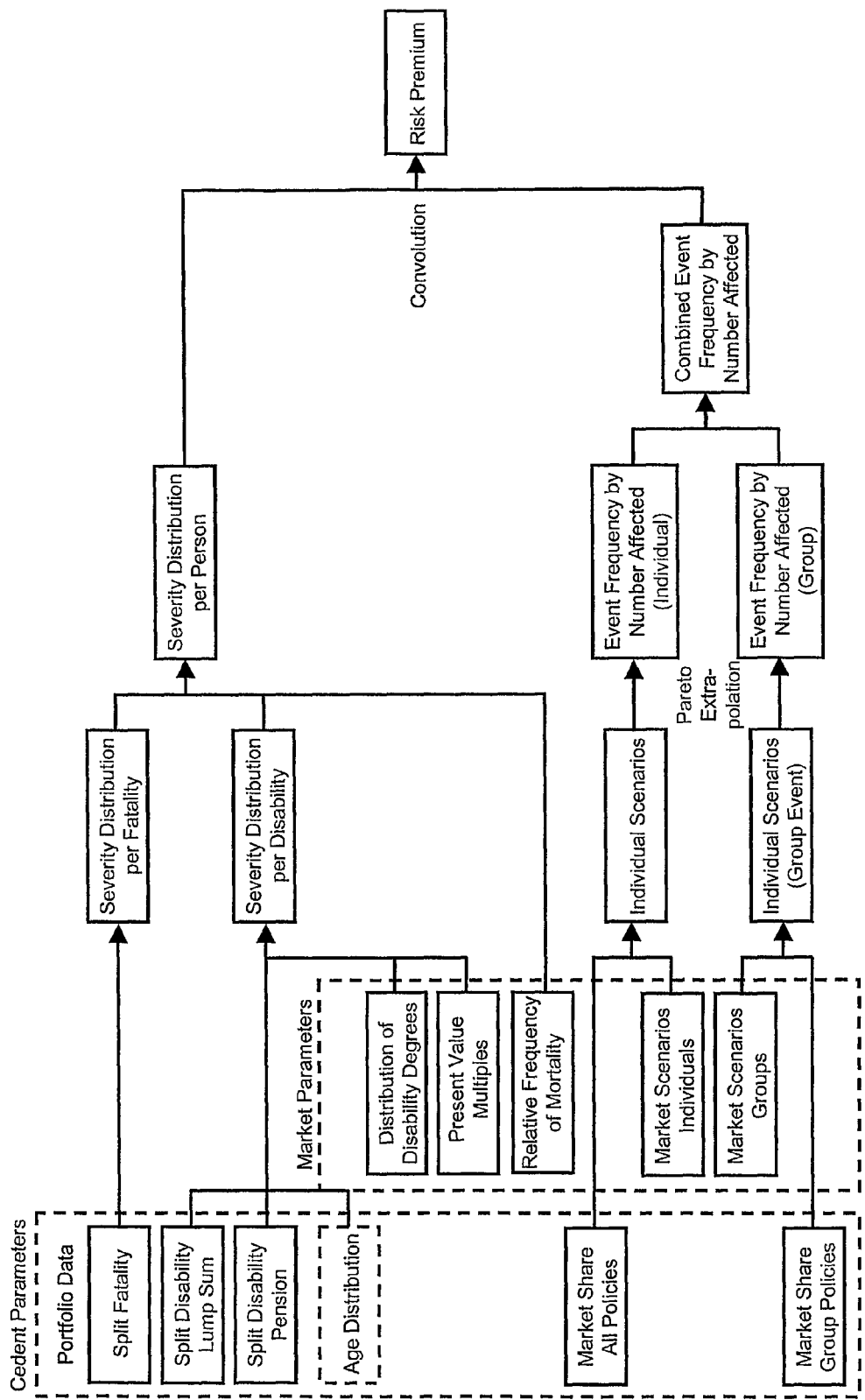
FIG. 6 shows a flow diagram illustrating an example of the calculation of an estimated risk premium from market parameters and cedent parameters according to the present invention.

As is illustrated in the overview diagram of FIG. 6, the combined set of loss event frequencies $f_N$ by number of individuals insured by the cedent and involved in a loss event is calculated from the first set of loss event frequencies $f_{N12}$ by number of individuals covered by the cedent under an individual policy and involved in the loss event and from the second set of loss event frequencies $F_{NAB}$ by number of individuals covered by the cedent in a group policy and involved in the loss event. The first set of loss event frequencies is calculated through Pareto extrapolation from the first and second individual scenarios for events involving individuals covered in an individual policy. The second set of loss event frequencies is calculated through Pareto extrapolation from the third and fourth individual scenarios for events involving individuals covered in a group policy. The individual scenarios for individual policies are calculated from market scenarios for individuals, considering the cedent's market share of all policies. The individual scenarios for group policies are calculated from market scenarios for groups, considering the cedent's market share of group policies.

In step S40 the risk premium is calculated from the loss event frequencies and severity data. If only individual policies are considered, the risk premium is calculated from the first set of loss event frequencies. Preferably however, individual and group policies are considered and the risk premium is calculated from the combined set of loss event frequencies. If calculation mode (a) is selected for calculating the estimated risk premium based on a fixed loss amount per person, the risk premium R for layer c xs d (c being the treaty limit, d being the deductible) is calculated:

$$R := \sum_{N=2}^{\infty} (f_N - f_{N+1}) \cdot \tau(NS),$$

wherein $$\tau(x) := \min(c, (x-d)^+)$$

and wherein S is the fixed amount of loss per person affected by the event.

Generally, for calculating the convolution, the number of individuals ranges from a defined lower bound to a defined upper bound, for example, the summation is limited to the range of N=2 to N=1000.

If calculation mode (b) is selected for calculating the estimated risk premium based on a distribution of loss amount per person, the risk premium R is calculated based on the cedent's portfolio data. For a distribution Y of loss amount per person, having the independent random variables $Y_1, Y_2, \ldots, Y_N$, the risk premium R for layer c xs d is calculated as:

$$R := \sum_{N=2}^{\infty} (f_N - f_{N+1}) \mathbb{E}(\tau(Y_1 + \ldots + Y_N)),$$

wherein $$\tau(x) := \min(c, (x-d)^+)$$

and wherein E is the expected value of the loss amount per person. It should be noted that $f_N - f_{N+1}$ is the frequency for a loss event involving (affecting) exactly N individuals and $E(\tau(Y_1 + Y_2 \ldots + Y_N))$ is the expected (xs) loss for such a loss event.

As an approximation, it is assumed that the random variables age, disability insurance sum, and disability pension are independent and a joint distribution of these random variables is calculated. The distribution of loss amount per person is calculated based on the joint distribution calculated, the distribution of disability degrees, the relative frequency of fatality $H_T$, the relative frequency of disability $H_I$, the data about the split of policies related to fatalities, and a table of annuities, considering deductibles and treaty limits.

Figure 5:
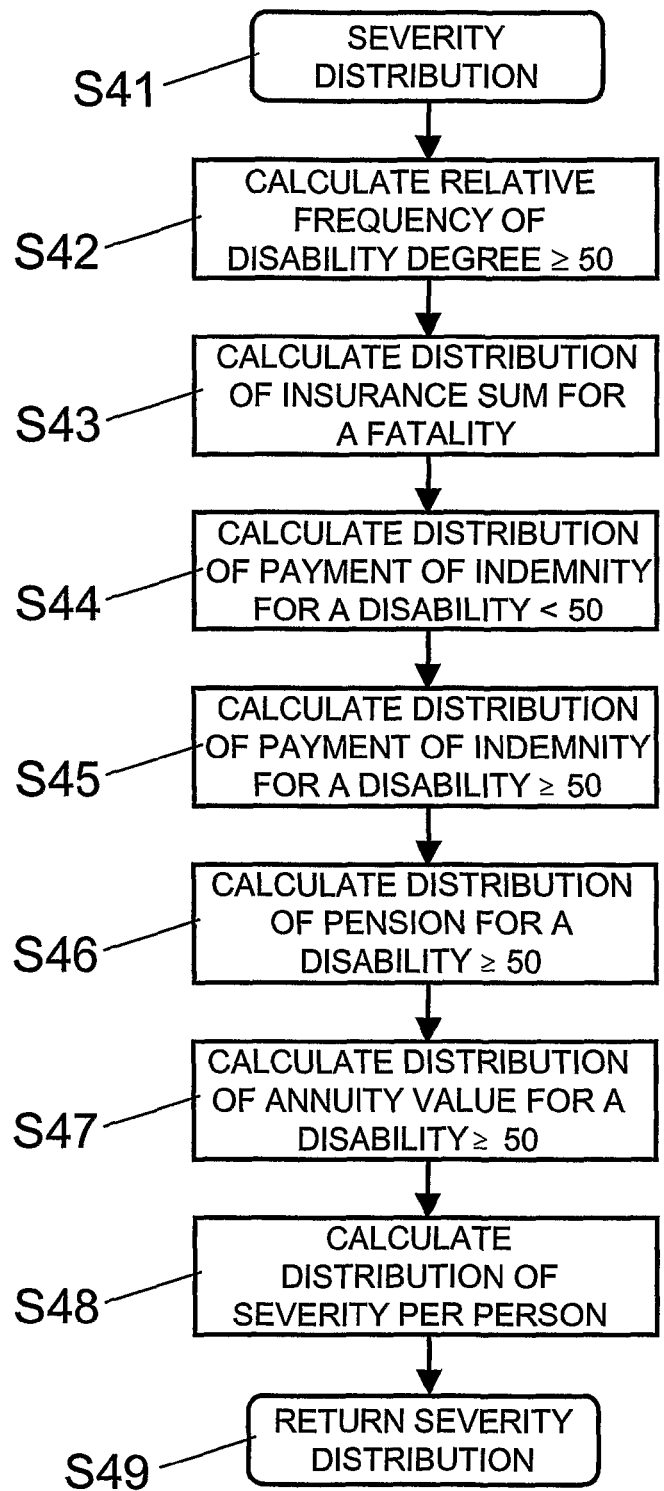
FIG. 5 shows a flow diagram illustrating an example of a sequence of steps for calculating a severity distribution, executed according to the present invention.

As is illustrated in FIG. 5, in step S41, the severity distribution calculation module 115 is started for calculating the distribution of loss amount per person.

In step S42, the relative frequency $p_{I \geq 50}$ for disability degrees greater or equal 50 is calculated:

$$p_{I \geq 50} := \sum_{i=50}^{100} p_i$$

In step S43, the distribution $\mu_{S_T}(x)$ of the insurance sum for a fatality is calculated:

$$\mu_{S_T}(x) = \frac{\text{Number of policies related to fatalities with insurance sum } x}{N_T}$$

wherein $N_T$ is the number of policies related to fatalities.

In step S44, the distribution $\mu_{S_{I<50}}$ of the payment of indemnity for a disability degree smaller than 50 is calculated:

$$\mu_{S_{I<50}} = \frac{1}{N_I \cdot (1 - p_{I\geq 50})} \sum_{i=1}^{N_I} \sum_{j=1}^{49} p_j \cdot \delta_{EL_i(j)}$$

wherein $EL_i(j)$ for $i=1, \ldots, N_I$ and $j=1, \ldots, 100$ is the payment of indemnity of the $i^{th}$ disability policy at disability degree $j$, wherein $\delta(x)$ is the degenerate distribution of $x$, and wherein $N_I$ is the number of policies related to disabilities with payment of indemnity.

Correspondingly, in step S45, the distribution $\mu_{S_{I\geq 50}}$ of the payment of indemnity for a disability degree greater than or equal 50 is calculated:

$$\mu_{S_{I\geq 50}} = \frac{1}{N_I \cdot p_{I\geq 50}} \sum_{i=1}^{N_I} \sum_{j=50}^{100} p_j \cdot \delta_{EL_i(j)}$$

In step S46, the distribution $\mu_R(X)$ of the monthly pension for a disability with disability degree greater than or equal 50 is calculated:

$$\mu_R(x) = \frac{\text{Number of policies with monthly pension } x}{N_I}$$

In step S47, the distribution $\mu_{SR}$ of the annuity value for a disability greater than or equal 50 is calculated based on the age distribution and the monthly pension for a disability with disability degree greater than or equal 50.

In step S48, the distribution $\mu_Y$ of the loss amount per person is calculated:

$$\mu_Y := H_T \cdot \mu_{S_T} + H_I \cdot ((1-p_{I\geq 50}) \cdot \mu_{S_{I<50}} + p_{I\geq 50} \cdot (\mu_{S_{I\geq 50}} * \mu_{S_R}))$$

wherein $H_T$ is the relative frequency of a fatality, wherein $H_I = 1 - H_T$ is the relative frequency of a disability, and wherein * denotes the convolution of distributions.

In step S49, the distribution $\mu_Y$ of the loss amount per person is returned to the risk premium calculation module 114.

It must be pointed out that different sequences of steps described with reference to FIGS. 2 to 5 are possible without deviating from the scope of the invention.

As is illustrated in the overview diagram of FIG. 6, the severity distribution of the loss amount per person is calculated based on the severity distribution per fatality, the severity distribution per disability and the relative frequency of fatalities or disabilities, respectively. The severity distribution per fatality as well as the severity distribution per disability are calculated based on cedent parameters including data about the split of policies related to fatalities, data about the split of policies related to disabilities with insurance sum, and data about the split of policies related to disabilities with pension. Finally, the risk premium is calculated through a multiplication from the severity distribution of the loss amount per person and from the combined set of loss event frequencies by number of individuals insured by the cedent and involved in a loss event. Although this is not discussed in detail, one skilled in the art will understand, that specific layer rating may be applied for calculating different premiums per insurance risk layer. Furthermore, one skilled in the art will understand, that user options for (selectively) deducting excess loss can be implemented.

In addition to the advantages already mentioned, the proposed system and method have the following advantageous characteristics: calculation of the loss distribution after inuring reinsurance, calculation of the loss distribution with respect to the individual portfolio data, and taking into consideration group policies.

The invention claimed is:

1. A computer-based system for calculating an estimated risk premium for reinsurance of a cedent's insurance policies covering loss event related fatalities and disabilities, comprising:

means for storing for a first type of market scenario, representative of a relatively small, first type of loss event for a defined insurance market, a frequency of the first type of loss event and a number of insured individuals involved in the first type of loss event;

means for storing for a second type of market scenario, representative of a relatively big, second type of loss event for the market, a frequency of the second type of loss event and a number of insured individuals involved in the second type of loss event;

means for calculating a first individual scenario, indicative of the cedent's exposure to the first type of loss event, based on the first type of market scenario;

means for calculating a second individual scenario, indicative of the cedent's exposure to the second type of loss event, based on the second type of market scenario;

means for calculating a first set of loss event frequencies, based on a combination of the first type of market scenario and the second type of market scenario, by number of individuals insured by the cedent and involved in a loss event, using a standard distribution for the number of insured individuals involved in the loss event and using the first individual scenario and the second individual scenario as interpolation points; and means for calculating the estimated risk premium from the first set of loss event frequencies and from severity data.

2. The system according to claim 1, wherein the means for calculating the first individual scenario is configured to calculate the first individual scenario by weighting the frequency of the first type of loss event with a market share of the cedent and by keeping unchanged the number of insured individuals involved in the first type of loss event; and wherein the means for calculating a second individual scenario is configured to calculate the second individual scenario by weighting the number of insured individuals involved in the second type of loss event with the market share of the cedent and by keeping unchanged the frequency of the second type of loss event.

3. The system according to claim 1, wherein the means for calculating the first set of loss event frequencies is configured to use a Pareto distribution for the number of insured individuals involved in a loss event, the number of individuals ranging from a defined lower bound to a defined upper bound.

4. The system according to claim 1, wherein the second type of market scenario is representative of a big loss event involving group policies and individual policies with equal probability; and wherein the system further comprises:
means for storing for a third type of market scenario, representative of a relatively medium, third type of loss event for the market involving mostly one group policy, a frequency of the third type of loss event and a number of insured individuals involved in the third type of loss event;
means for storing for a fourth type of market scenario, representative of a relatively big, fourth type of loss event for the market involving mostly one group policy, a frequency of the fourth type of loss event and a number of insured individuals involved in the fourth type of loss event;
means for calculating a third individual scenario, indicative of the cedent's exposure to the third type of loss event, based on the third type of market scenario;
means for calculating a fourth individual scenario, indicative of the cedent's exposure to the fourth type of loss event, based on the fourth type of market scenario; and
means for calculating, using the third individual scenario and the fourth individual scenario as interpolation points, a second set of loss event frequencies by number of individuals insured by the cedent and involved in the loss event; and
wherein the means for calculating the estimated risk premium is configured to calculate the risk premium from the first set of loss event frequencies, the second set of loss event frequencies, and the severity data.

5. The system according to claim 4, wherein the means for calculating the third individual scenario is configured to calculate the third individual scenario by weighting the frequency of the third type of loss event with a group market share of the cedent and by keeping unchanged the number of insured individuals involved in the third type of loss event; and wherein the means for calculating the fourth individual scenario is configured to calculate the fourth individual scenario by weighting the frequency of the fourth type of loss event with a group market share of the cedent and by keeping unchanged the number of insured individuals involved in the fourth type of loss event.

6. The system according to claim 4, wherein the means for calculating the second set of loss event frequencies is configured to use a Pareto distribution for the number of insured individuals involved in a loss event, the number of individuals ranging from a defined lower bound to a defined upper bound.

7. The system according to claim 1, further comprising:
means for storing the severity data as a fixed loss amount per insured individual; and
wherein the means for calculating the estimated risk premium is configured to calculate the risk premium based on the severity data stored.

8. The system according to claim 1, further comprising:
means to store portfolio data with information about the cedent's insurance policies, including number of policies with insurance sum for disability, values of the insurance sum for different degrees of disability, number of policies with pensions for disability, values of the pensions for different degrees of disability, number of policies with insurance sum for fatality, and values of the insurance sum for fatality; and
means to calculate the severity data as a severity distribution of loss amount per insured individual from stored information about the cedent's insurance policies, from an age distribution of insured individuals, and from market information, including a relative frequency of fatality or disability and relative frequencies of the degrees of disability, age of insured individuals, the values of the insurance sums, and the values of the pensions being considered to be independent random variables; and
wherein the means for calculating the estimated risk premium is configured to calculate the risk premium based on the severity data calculated.

9. A computer implemented method to calculate an estimated risk premium for reinsurance of a cedent's insurance policies covering loss event related fatalities and disabilities, comprising:
storing, by storage device, for a first type of market scenario, representative of a relatively small, first type of loss event for a defined insurance market, a frequency of the first type of loss event and a number of insured individuals involved in the first type of loss event;
storing, by the storage device, for a second type of market scenario, representative of a relatively big, second type of loss event for the market, a frequency of the second of loss event and a number of insured individual involved in the second type of loss event;
calculating, by a computer, a first individual scenario, indicative of the cedent's exposure to the first type of loss event, based on the first type of market scenario stored in the storage device;
calculating, by the computer, a second individual scenario, indicative of the cedent's exposure to the second type of loss event, based on the second type of market scenario stored in the storage device;
calculating, by the computer, a first set of loss event frequencies, based on a combination of the first type of market scenario and the second type of market scenario, by number of individuals insured by the cedent and involved in a loss event, using a standard distribution for the number of insured individuals involved in the loss event and using the first individual scenario and the second individual scenario as interpolation points; and
calculating by the computer, the estimated risk premium from the first set of loss event frequencies and from severity data.

10. The computer implemented method according to claim 9, wherein the first individual scenario is calculated by weighting the frequency of the first type of loss event with a market share of the cedent and by keeping unchanged the number of insured individuals involved in the first type of loss event; and wherein the second individual scenario is calculated by weighting the number of insured individuals involved in the second type of loss event with the market share of the cedent and by keeping unchanged the frequency of the second type of loss event.

11. The computer implemented method according to claim 9, wherein for calculating the first set of loss event frequencies a Pareto distribution is used for the number of insured individuals involved in a loss event, the number of individuals ranging from a defined lower bound to a defined upper bound.

12. The computer implemented method according to claim 9, wherein the second type of market scenario is representative of a relatively big loss event involving group policies and individual policies with equal probability; and wherein the method further comprises:
storing, by the storage device, for a third type of market scenario, representative of a relatively medium, third type of loss event for the market involving mostly one group policy, a frequency of the third type of loss event and a number of insured individuals involved in the third type of loss event;
storing, by the storage device, for a fourth type of market scenario, representative of a relatively big, fourth type of loss event for the market involving mostly one group policy, a frequency of the fourth type of loss event and a number of insured individuals involved in the fourth type of loss event;

calculating, by the computer, a third individual scenario, indicative of the cedent's exposure to the third type of loss event, based on the third type of market scenario stored in the storage device;

calculating, by the computer, a fourth individual scenario, indicative of the cedent's exposure to the fourth type of loss event, based on the fourth type of market scenario stored in the storage device; and calculating, by the computer, using the third individual scenario and the fourth individual scenario as interpolation points, a second set of loss event frequencies by number of individuals insured by the cedent and involved in the loss event; and wherein the risk premium is calculated from the first set of loss event frequencies, the second set of loss event frequencies, and the severity data.

13. The computer implemented method according to claim 12, wherein the third individual scenario is calculated by weighting the frequency of the third type of loss event with a group market share of the cedent and by keeping unchanged the number of insured individuals involved in the third type of loss event; and wherein the fourth individual scenario is calculated by weighting the frequency of the fourth type of loss event with a group market share of the cedent and by keeping unchanged the number of insured individuals involved in the fourth type of loss event.

14. The computer implemented method according to claim 12, wherein for calculating the second set of loss event frequencies a Pareto distribution is used for the number of insured individuals involved in a loss event, the number of individuals ranging from a defined lower bound to a defined upper bound.

15. The computer implemented method according to claim 9, wherein the severity data is stored as a fixed loss amount per insured individual; and wherein the risk premium is calculated based on the severity data stored.

16. The computer implemented method according to claim 9, further comprising:

storing, by the storage device, portfolio data with information about the cedent's insurance policies, including number of policies with insurance sum for disability, values of the insurance sum for different degrees of disability, number of policies with pensions for disability, values of the pensions for different degrees of disability, number of policies with insurance sum for fatality, and values of the insurance sum for fatality; and calculating, by the computer, the severity data as a severity distribution of loss amount per insured individual from stored information about the cedent's insurance policies, from an age distribution of insured individuals, and from market information, including a relative frequency of fatality or disability and relative frequencies of the degrees of disability, age of insured individuals, the values of the insurance sums, and the values of the pensions being considered to be independent random variables; and wherein the estimated risk premium is calculated based on the severity data calculated.

17. A non-transitory computer readable medium containing therein computer program code for controlling one or more processors of a computer to perform a method comprising:

storing for a first type of market scenario, representative of a relatively small, first type of loss event for a defined insurance market, a frequency of the first type of loss event and a number of insured individuals involved in the first type of loss event;

storing for a second type of market scenario, representative of a relatively big, second type of loss event for the market, a frequency of the second of loss event and a number of insured individual involved in the second type of loss event;

calculating a first individual scenario, indicative of the cedent's exposure to the first type of loss event, based on the first type of market scenario;

calculating a second individual scenario, indicative of the cedent's exposure to the second type of loss event, based on the second type of market scenario;

calculating a first set of loss event frequencies, based on a combination of the first type of market scenario and the second type of market scenario, by number of individuals insured by the cedent and involved in a loss event, using a standard distribution for the number of insured individuals involved in the loss event and using the first individual scenario and the second individual scenario as interpolation points; and calculating the estimated risk premium from the first set of loss event frequencies and from severity data.

* * * * *